US008494707B1

(12) United States Patent
Bennah et al.

(10) Patent No.: US 8,494,707 B1
(45) Date of Patent: Jul. 23, 2013

(54) MAINTAINING A DYNAMIC SERVICE REGISTRY FOR A SELF-DIAGNOSING DEVICE

(75) Inventors: Albert D. Bennah, Cary, NC (US); William G. Pagan, Durham, NC (US); Adrian X. Rodriguez, Durham, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/407,866

(22) Filed: Feb. 29, 2012

(51) Int. Cl.
*G01M 17/00* (2006.01)
*G06F 7/00* (2006.01)
*G06F 11/30* (2006.01)
*G06F 19/00* (2011.01)
*G07C 5/00* (2006.01)

(52) U.S. Cl.
USPC ..................................... 701/29.4

(58) Field of Classification Search
USPC ..................................... 701/29.4
See application file for complete search history.

(56) References Cited

U.S. PATENT DOCUMENTS

| | | | | |
|---|---|---|---|---|
| 5,442,553 A | * | 8/1995 | Parrillo | 455/420 |
| 5,781,125 A | * | 7/1998 | Godau et al. | 340/870.01 |
| 6,047,234 A | * | 4/2000 | Cherveny et al. | 701/451 |
| 6,055,468 A | * | 4/2000 | Kaman et al. | 701/99 |
| 6,330,499 B1 | * | 12/2001 | Chou et al. | 701/31.4 |
| 6,339,736 B1 | * | 1/2002 | Moskowitz et al. | 701/32.7 |
| 6,438,471 B1 | * | 8/2002 | Katagishi et al. | 701/31.4 |
| 6,542,794 B2 | * | 4/2003 | Obradovich | 701/1 |
| 6,549,833 B2 | * | 4/2003 | Katagishi et al. | 701/31.6 |
| 6,577,928 B2 | * | 6/2003 | Obradovich | 701/1 |
| 6,636,801 B2 | | 10/2003 | Curbow | |
| 6,735,504 B2 | * | 5/2004 | Katagishi et al. | 701/31.6 |
| 7,054,822 B2 | * | 5/2006 | McCall | 705/7.15 |
| 7,142,844 B2 | * | 11/2006 | Obradovich et al. | 455/414.1 |
| 7,171,291 B2 | * | 1/2007 | Obradovich | 701/29.4 |
| 7,233,861 B2 | * | 6/2007 | Van Buer et al. | 701/424 |
| 7,409,275 B2 | * | 8/2008 | Sakurai et al. | 701/29.1 |
| 7,877,206 B2 | * | 1/2011 | Cabral et al. | 701/414 |
| 8,041,779 B2 | * | 10/2011 | Habaguchi et al. | 709/219 |
| 8,204,688 B2 | * | 6/2012 | Cabral et al. | 701/533 |
| 2004/0153356 A1 | * | 8/2004 | Lockwood et al. | 705/9 |
| 2005/0149237 A1 | | 7/2005 | Bates | |

(Continued)

OTHER PUBLICATIONS

Vlădoiu et al., "Toward Location-Based Services Using GPS-Based Devices", Proceedings of the World Congress on Engineering 2008 (WCE 2008), Jul. 2008, pp. 1-6, vol. 1, International Association fo Engineers, London, UK.
"On-Board Diagnostics", www.wikipedia.org [online] 2012, 12 pp., [accessed online Jan. 20, 2012], URL: http://en.wikipedia.org/wiki/On-board_diagnostics.
"Automotive Customer Retention Ratings", www.cars.com [online] 2012, 2 pp., [accessed online Jan. 20, 2012]; URL: http://www.cars.com/go/advice/Story.jsp?section=top&subject=csr&story=csrCsi&referer=&aff=national.
"OBD GPS Logger for Linux and OSX", icculus.org [online] 2012, 4 pp., [accessed online Jan. 20, 2012]; URL: http://icculus.org/obdgpslogger/.

*Primary Examiner* — Mary Cheung
*Assistant Examiner* — Frederick Brushaber
(74) *Attorney, Agent, or Firm* — Brandon C. Kennedy; Cynthia G. Seal; Biggers & Ohanian, LLP

(57) ABSTRACT

Maintaining a dynamic service registry for a self-diagnosing device, including: detecting, by the self-diagnosing device, a fault condition, wherein the fault condition indicates that the self-diagnosing device needs to be serviced; detecting, by the self-diagnosing device, that the fault condition has been resolved; determining, by the self-diagnosing device, the geographic location of the self-diagnosing device upon detecting that the fault condition was resolved; and entering, by the self-diagnosing device, the fault condition and the geographic location of the self-diagnosing device when the fault condition was resolved into the dynamic service registry.

18 Claims, 5 Drawing Sheets

U.S. PATENT DOCUMENTS

| | | |
|---|---|---|
| 2007/0281690 A1 | 12/2007 | Altman et al. |
| 2009/0048944 A1* | 2/2009 | Eagle .............................. 705/27 |
| 2009/0222161 A1* | 9/2009 | Tsai et al. ....................... 701/30 |
| 2009/0222338 A1 | 9/2009 | Hamilton, II et al. |
| 2010/0167760 A1 | 7/2010 | Kim |
| 2011/0112717 A1 | 5/2011 | Resner |
| 2011/0143775 A1 | 6/2011 | Liu et al. |

* cited by examiner

MAINTAINING A DYNAMIC SERVICE REGISTRY FOR A SELF-DIAGNOSING DEVICE

BACKGROUND OF THE INVENTION

1. Field of the Invention

The field of the invention is data processing, or, more specifically, methods, apparatus, and products for maintaining a dynamic service registry for a self-diagnosing device.

2. Description of Related Art

Modern automobiles are being equipped with an ever increasing array of technology to help achieve greater fuel efficiency and to become more crash resistant. With the integration of global positioning system ('GPS'), automobiles are able to help drivers find their destinations much easier. However, vehicles today are not aware in any way of their own service histories and their owner's preferred service locations.

SUMMARY OF THE INVENTION

Methods, apparatus, and products for maintaining a dynamic service registry for a self-diagnosing device, including: detecting, by the self-diagnosing device, a fault condition, wherein the fault condition indicates that the self-diagnosing device needs to be serviced; detecting, by the self-diagnosing device, that the fault condition has been resolved; determining, by the self-diagnosing device, the geographic location of the self-diagnosing device upon detecting that the fault condition was resolved; and entering, by the self-diagnosing device, the fault condition and the geographic location of the self-diagnosing device when the fault condition was resolved into the dynamic service registry.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
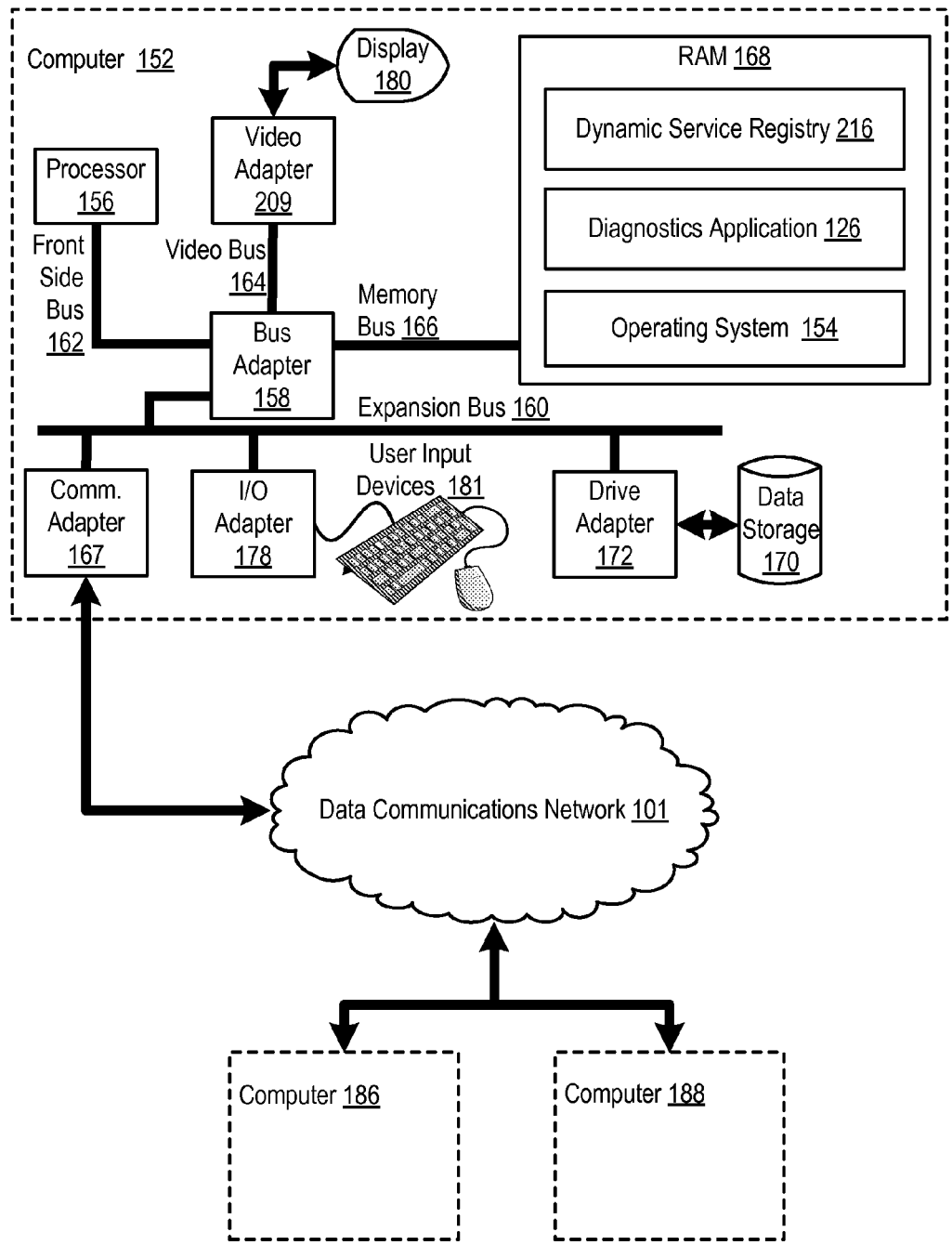
FIG. 1 sets forth a block diagram of automated computing machinery comprising an example computer useful in maintaining a dynamic service registry for a self-diagnosing device according to embodiments of the present invention.

Example methods, apparatus, and products for maintaining a dynamic service registry for a self-diagnosing device in accordance with the present invention are described with reference to the accompanying drawings, beginning with FIG. 1. FIG. 1 sets forth a block diagram of automated computing machinery comprising an example computer (152) useful in maintaining a dynamic service registry for a self-diagnosing device according to embodiments of the present invention. A self-diagnosing device may be any device with diagnostic capabilities such that the self-diagnosing device is capable of determining its own health, measuring its own performance, and so on. For example, the self-diagnosing device may be embodied as an automobile equipped with sensors to measure engine temperature, fluid levels, tire pressure, and other indicia of the current state of the automobile. Such an automobile may be 'self-diagnosing' in the sense that such information can be compared to acceptable ranges to determine whether any measurements taken by the automobile indicate that the automobile is operating in a way that indicates the need to service the automobile. For example, if the engine temperature of the automobile is determined to be above acceptable levels, the automobile and its cooling system may need to be serviced in order to prevent eventual damage to the engine and harm to the automobile. In the example of FIG. 1, the computer (152) may be included as part of such a self-diagnosing device.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is a diagnostics application (126), a module of computer program instructions for maintaining a dynamic service registry for a self-diagnosing device according to embodiments of the present invention.

The diagnostics application (126) of FIG. 1 may be configured to detect a fault condition. The fault condition of FIG. 1 indicates that the self-diagnosing device needs to be serviced. Detecting a fault condition may be carried out, for example, through the use of sensors configured to measure various aspects describing the current state of the self-diagnosing device. Each sensor may return a measured value related to a particular attribute of the self-diagnosing device. The measured value may be compared to a predetermined acceptable range of values. If the measured value is not within the predetermined acceptable range of values, a fault condition does exist with respect to the measured value.

Consider an example in which the self-diagnosing device is an automobile. In such an example, the automobile may include an oil level sensor for measuring the amount of oil in the automobile's engine. In such an example, the acceptable range of values for the amount of oil in the automobile's engine may be between 4 quarts and 5 quarts of oil. If the oil level sensor for measuring the amount of oil in the automobile's engine returns a value indicating that the measured amount of oil in the automobile's engine is 3 quarts of oil, a fault condition is detected.

The diagnostics application (126) of FIG. 1 may be further configured to detect that the fault condition has been resolved. Detecting that the fault condition has been resolved may be carried out, for example, through the use of sensors configured to measure various aspects describing the current state of the self-diagnosing device. Each sensor may return a measured value related to a particular attribute of the self-diagnosing device. The measured value may be compared to a predetermined acceptable range of values. If the measured value is within the predetermined acceptable range of values, the fault condition has been resolved.

Consider the example described above in which the self-diagnosing device is an automobile that includes an oil level sensor for measuring the amount of oil in the automobile's engine. In such an example, the acceptable range of values for the amount of oil in the automobile's engine may be between 4 quarts and 5 quarts of oil. If oil has been added to the engine and the oil level sensor for measuring the amount of oil in the automobile's engine returns a value indicating that the measured amount of oil in the automobile's engine is now 4.5 quarts of oil, the fault condition has been resolved.

The diagnostics application (126) of FIG. 1 may further be configured to determine the geographic location of the self-diagnosing device upon detecting that the fault condition was resolved. The geographic location of the self-diagnosing device that is determined upon detecting that the fault condition was resolved may represent, for example, the location of a service provider that successfully resolved the fault condition. The geographic location of the self-diagnosing device may be determined, for example, through the use of global positioning system ('GPS') receiver configured to receive the GPS coordinates at which the GPS receiver is located.

Consider the example described above in which the self-diagnosing device is an automobile that includes an oil level sensor for measuring the amount of oil in the automobile's engine. In such an example, after the fault condition described above has been resolved, the automobile may use a GPS receiver or other location determine technology to determine the geographic location of the automobile upon detecting that the fault condition was resolved. Such a geographic location may represent, for example, the location of a mechanic, auto repair shop, or other service provider that was able to successfully resolve the fault condition previously detected in the automobile.

The diagnostics application (126) of FIG. 1 may be further configured to enter into the dynamic service registry (216) the fault condition and the geographic location of the self-diagnosing device when the fault condition was resolved. The dynamic service (216) registry may be embodied as a data structure for storing information related to the successful resolution of fault conditions. The dynamic service registry (216) may be configured to store, for example, an identifier for the fault condition, measured values associated with the fault condition, the geographic location of a service provider that successfully resolved the fault condition, other information describing the service provider such as, for example, a phone number, physical address, email address, service technician identifier, and so on. Entering the fault condition and the geographic location of the self-diagnosing device (216) when the fault condition was resolved into the dynamic service registry (216) may be carried out, for example, by creating a new entry in the dynamic service registry (216) and storing information describing the fault condition and the geographic location of the self-diagnosing device when the fault condition was resolved in the dynamic service registry (216).

Consider the example described above in which the self-diagnosing device is an automobile that includes an oil level sensor for measuring the amount of oil in the automobile's engine. In such an example, after the fault condition described above has been resolved and the geographic location of the automobile has been determined, the self-diagnosing device may subsequently create a new entry in the dynamic service registry (216). The self-diagnosing device may populate the new entry in the dynamic service registry (216) such that the fault condition and the geographic location of the self-diagnosing device when the fault condition was resolved may be stored in the dynamic service registry (216). For example, the self-diagnosing device may store within the new entry in the dynamic service registry (216) an identifier associated with a 'low engine oil' failure event as well as the GPS coordinates of the automobile at the time at which the self-diagnosing device detected that the fault condition had been successfully resolved.

Also stored in RAM (168) is an operating system (154). Operating systems useful maintaining a dynamic service registry for a self-diagnosing device according to embodiments of the present invention include UNIX™, Linux™, Microsoft XP™, AIX™, IBM's i5/OS™, and others as will occur to those of skill in the art. The operating system (154), dynamic service registry (216), and diagnostics application (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for maintaining a dynamic service registry for a self-diagnosing device according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as a keyboard, touch screen display, and so on. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (186, 188) and for data communications with a data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for maintaining a dynamic service registry for a self-diagnosing device according to embodiments of the present invention include modems for wired dial-up communications, Ethernet (IEEE 802.3) adapters for wired data communications network communications, and 802.11 adapters for wireless data communications network communications.

Figure 2:
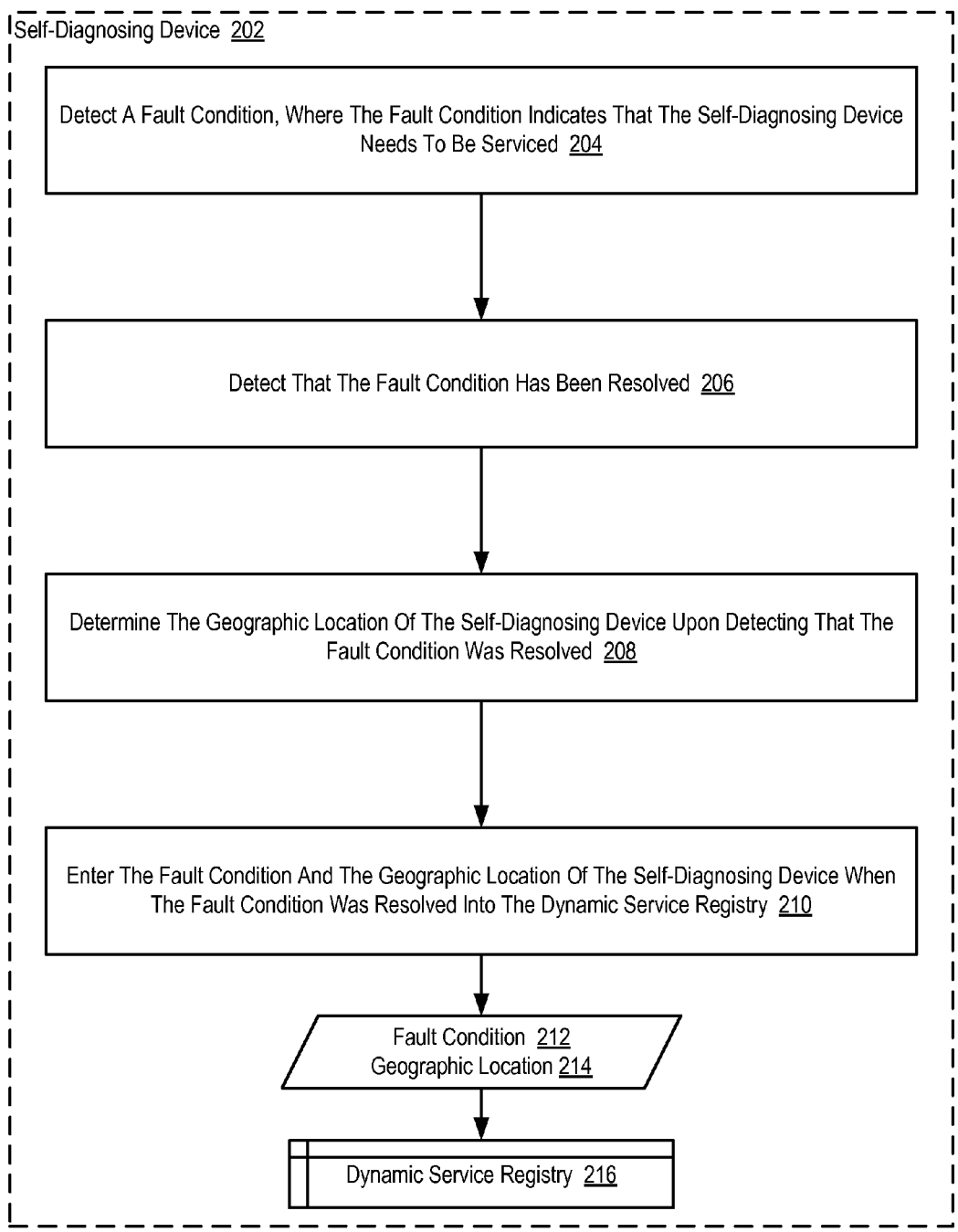
FIG. 2 sets forth a flow chart illustrating an example method for maintaining a dynamic service registry for a self-diagnosing device according to embodiments of the present invention.

For further explanation, FIG. 2 sets forth a flow chart illustrating an example method for maintaining a dynamic service registry (216) for a self-diagnosing device (202)

according to embodiments of the present invention. In the example method of FIG. 2, the self-diagnosing device (202) may be any device with diagnostic capabilities such that the self-diagnosing device (202) is capable of determining its own health, measuring its own performance, and so on. For example, the self-diagnosing device (202) may be embodied as an automobile equipped with sensors to measure engine temperature, fluid levels, tire pressure, and other indicia of the current state of the automobile. Such an automobile may be 'self-diagnosing' in the sense that such information can be compared to acceptable ranges to determine whether any measurements taken by the automobile indicate that the automobile is operating in a way that indicates the need to service the automobile. For example, if the engine temperature of the automobile is determined to be above acceptable levels, the automobile and its cooling system may need to be serviced in order to prevent eventual damage to the engine and harm to the automobile.

The example method of FIG. 2 includes detecting (204), by the self-diagnosing device (202), a fault condition. In the example method of FIG. 2, the fault condition indicates that the self-diagnosing device (202) needs to be serviced. Detecting (204) a fault condition may be carried out, for example, through the use of sensors configured to measure various aspects describing the current state of the self-diagnosing device (202). Each sensor may return a measured value related to a particular attribute of the self-diagnosing device (202). The measured value may be compared to a predetermined acceptable range of values. If the measured value is not within the predetermined acceptable range of values, a fault condition does exist with respect to the measured value.

Consider an example in which the self-diagnosing device (202) is an automobile. In such an example, the automobile may include an oil level sensor for measuring the amount of oil in the automobile's engine. In such an example, the acceptable range of values for the amount of oil in the automobile's engine may be between 4 quarts and 5 quarts of oil. If the oil level sensor for measuring the amount of oil in the automobile's engine returns a value indicating that the measured amount of oil in the automobile's engine is 3 quarts of oil, a fault condition is detected (204).

The example method of FIG. 2 also includes detecting (206), by the self-diagnosing device (202), that the fault condition has been resolved. Detecting (206) that the fault condition has been resolved may be carried out, for example, through the use of sensors configured to measure various aspects describing the current state of the self-diagnosing device (202). Each sensor may return a measured value related to a particular attribute of the self-diagnosing device (202). The measured value may be compared to a predetermined acceptable range of values. If the measured value is within the predetermined acceptable range of values, the fault condition has been resolved.

Consider the example described above in which the self-diagnosing device (202) is an automobile that includes an oil level sensor for measuring the amount of oil in the automobile's engine. In such an example, the acceptable range of values for the amount of oil in the automobile's engine may be between 4 quarts and 5 quarts of oil. If oil has been added to the engine and the oil level sensor for measuring the amount of oil in the automobile's engine returns a value indicating that the measured amount of oil in the automobile's engine is now 4.5 quarts of oil, the fault condition has been resolved.

The example method of FIG. 2 also includes determining (208), by the self-diagnosing device (202), the geographic location of the self-diagnosing device (202) upon detecting that the fault condition was resolved. In the example method of FIG. 2, the geographic location of the self-diagnosing device (202) that is determined (208) upon detecting that the fault condition was resolved may represent, for example, the location of a service provider that successfully resolved the fault condition. The geographic location of the self-diagnosing device (202) may be determined (208), for example, through the use of a GPS receiver configured to receive the GPS coordinates at which the GPS receiver is located.

Consider the example described above in which the self-diagnosing device (202) is an automobile that includes an oil level sensor for measuring the amount of oil in the automobile's engine. In such an example, after the fault condition described above has been resolved, the automobile may use a GPS receiver or other location determine technology to determine the geographic location of the automobile upon detecting that the fault condition was resolved. Such a geographic location may represent, for example, the location of a mechanic, auto repair shop, or other service provider that was able to successfully resolve the fault condition previously detected in the automobile.

The example method of FIG. 2 also includes entering (210) into the dynamic service registry (216), by the self-diagnosing device (202), the fault condition and the geographic location of the self-diagnosing device (202) when the fault condition was resolved. In the example method of FIG. 2, the dynamic service registry (216) may be embodied as a data structure for storing information related to the successful resolution of fault conditions. The dynamic service registry (216) may be configured to store, for example, an identifier for the fault condition, measured values associated with the fault condition, the geographic location of a service provider that successfully resolved the fault condition, other information describing the service provider such as, for example, a phone number, physical address, email address, service technician identifier, and so on. In the example method of FIG. 2, entering (210) the fault condition and the geographic location of the self-diagnosing device (202) when the fault condition was resolved into the dynamic service registry (216) may be carried out, for example, by creating a new entry in the dynamic service registry (216) and storing information describing the fault condition and the geographic location of the self-diagnosing device (202) when the fault condition was resolved in the dynamic service registry (216).

Consider the example described above in which the self-diagnosing device (202) is an automobile that includes an oil level sensor for measuring the amount of oil in the automobile's engine. In such an example, after the fault condition described above has been resolved and the geographic location of the automobile has been determined, the self-diagnosing device (202) may subsequently create a new entry in the dynamic service registry (216). The self-diagnosing device (202) may populate the new entry in the dynamic service registry (216) such that the fault condition and the geographic location of the self-diagnosing device (202) when the fault condition was resolved may be stored in the dynamic service registry (216). For example, the self-diagnosing device (202) may store within the new entry in the dynamic service registry (216) an identifier associated with a 'low engine oil' failure event as well as the GPS coordinates of the automobile at the time at which the self-diagnosing device (202) detected that the fault condition had been successfully resolved.

Figure 3:
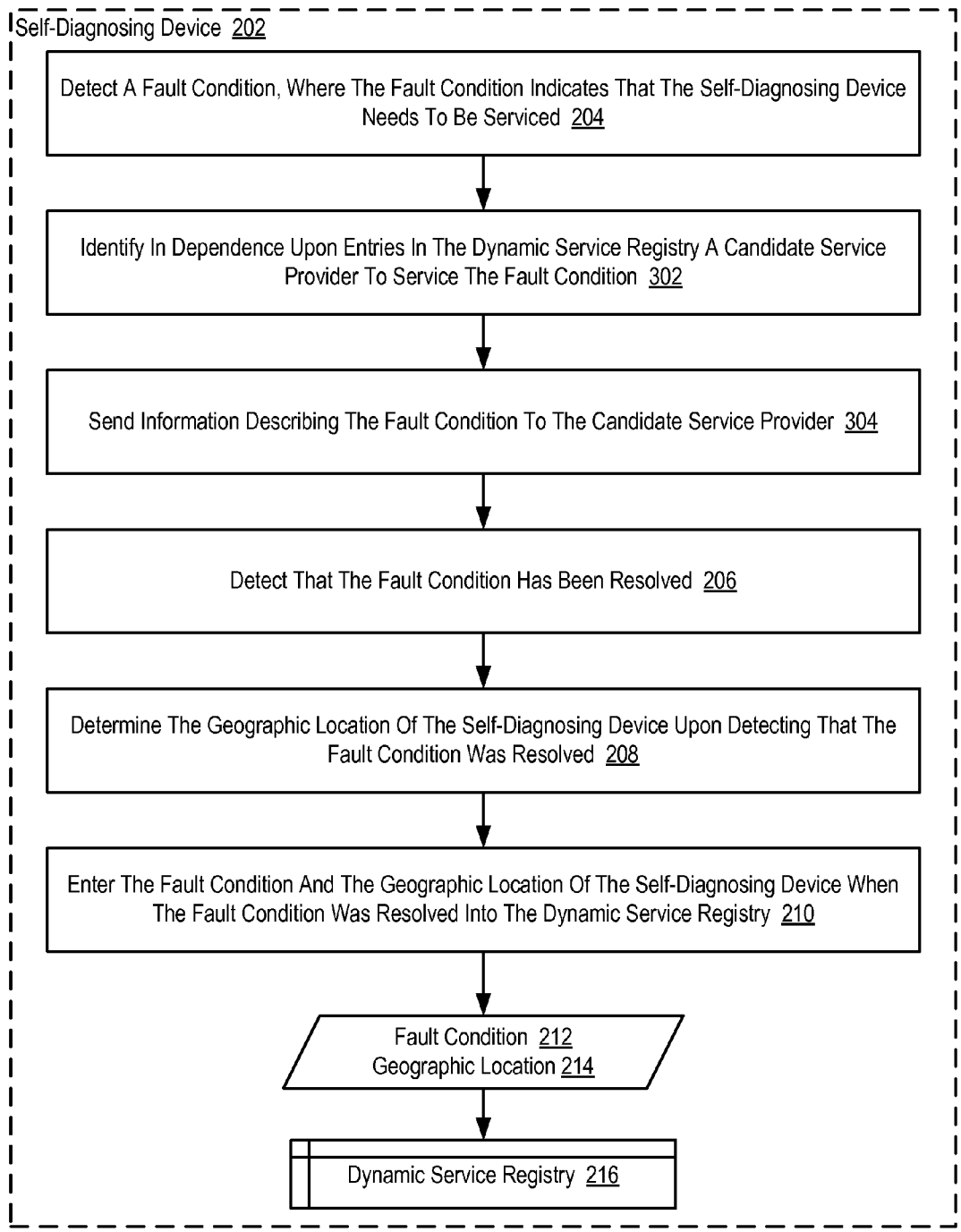
FIG. 3 sets forth a flow chart illustrating a further example method for maintaining a dynamic service registry for a self-diagnosing device according to embodiments of the present invention.

For further explanation, FIG. 3 sets forth a flow chart illustrating a further example method for maintaining a dynamic service registry (216) for a self-diagnosing device (202) according to embodiments of the present invention. The example of FIG. 3 is similar to the example of FIG. 2 as it also includes detecting (204) a fault condition, detecting (206) that the fault condition has been resolved, determining (208) the geographic location of the self-diagnosing device (202) upon detecting that the fault condition was resolved, and entering (210) into the dynamic service registry (216) the fault condition and the geographic location of the self-diagnosing device (202) when the fault condition was resolved.

The example method of FIG. 3 also includes identifying (302) in dependence upon entries in the dynamic service registry (216), by the self-diagnosing device (202), a candidate service provider to service the fault condition. As described above, the dynamic service registry (216) includes information related to the successful resolution of fault conditions. The dynamic service registry (216) may therefore be a useful resource for identifying service providers that can potentially resolve unresolved fault events as the dynamic service registry (216) identifies those service providers, or at least their location, who have previously resolved fault events. As such, identifying (302) a candidate service provider to service a fault condition in dependence upon entries in the dynamic service registry (216) may be carried out, for example, by searching the dynamic service registry (216) for entries to identify identical fault conditions that were previously resolved and selecting the service provider associated with the successful resolution of an identical fault condition in the past.

Consider the example described above in which the self-diagnosing device (202) is an automobile that includes an oil level sensor for measuring the amount of oil in the automobile's engine. In such an example, if a fault condition is detected through the use of the oil level sensors, the dynamic service registry (216) may be searched to determine if an identical fault condition had been successfully resolved in the past. For example, a 'low oil level' fault condition may be identified by a particular identifier. In such an example, the dynamic service registry (216) may be searched for entries with the same identifier as these entries would represent the successful resolution of a 'low oil level' fault condition in the past. If an entry is found, the geographic location of the self-diagnosing device (202) when the fault condition was resolved may be retrieved from the matching entry and the service provider located at such a geographic location may be identified (302) as a candidate service provider in view of the service provider's history of successfully resolving an identical fault condition in the past.

Although the example described above describes identifying (302) a candidate service provider to service the fault condition in terms of identifying a service provider that has previously resolved an identical fault condition, readers will appreciate that some fault conditions may be similar in nature such that identifying (302) a candidate service provider to service the fault condition may be carried out by identifying a service provider that has successfully resolved similar or related fault conditions. For example, a 'low oil level' fault condition may be serviced by a service provider that has previously resolved a 'oil change overdue' fault condition as the service provider has demonstrated familiarity with the oil system of an automobile engine.

The example method of FIG. 3 also includes sending (304), by the self-diagnosing device (202), information describing the fault condition to the candidate service provider. As described above, the dynamic service registry (216) may be configured to store information describing the service provider such as, for example, a phone number, physical address, email address, service technician identifier, and so on. As such, information describing the fault condition may be sent (304) to the candidate service provider through the use of such information. For example, the self-diagnosing device (202) may be configured to automatically generate an email message and send the email message to the email address for the candidate service provider that is contained in the dynamic service registry (216). Such an email message could include, for example, information describing the fault condition such as the identifier for the fault condition, measured values associated with the fault condition, and so on.

Figure 4:
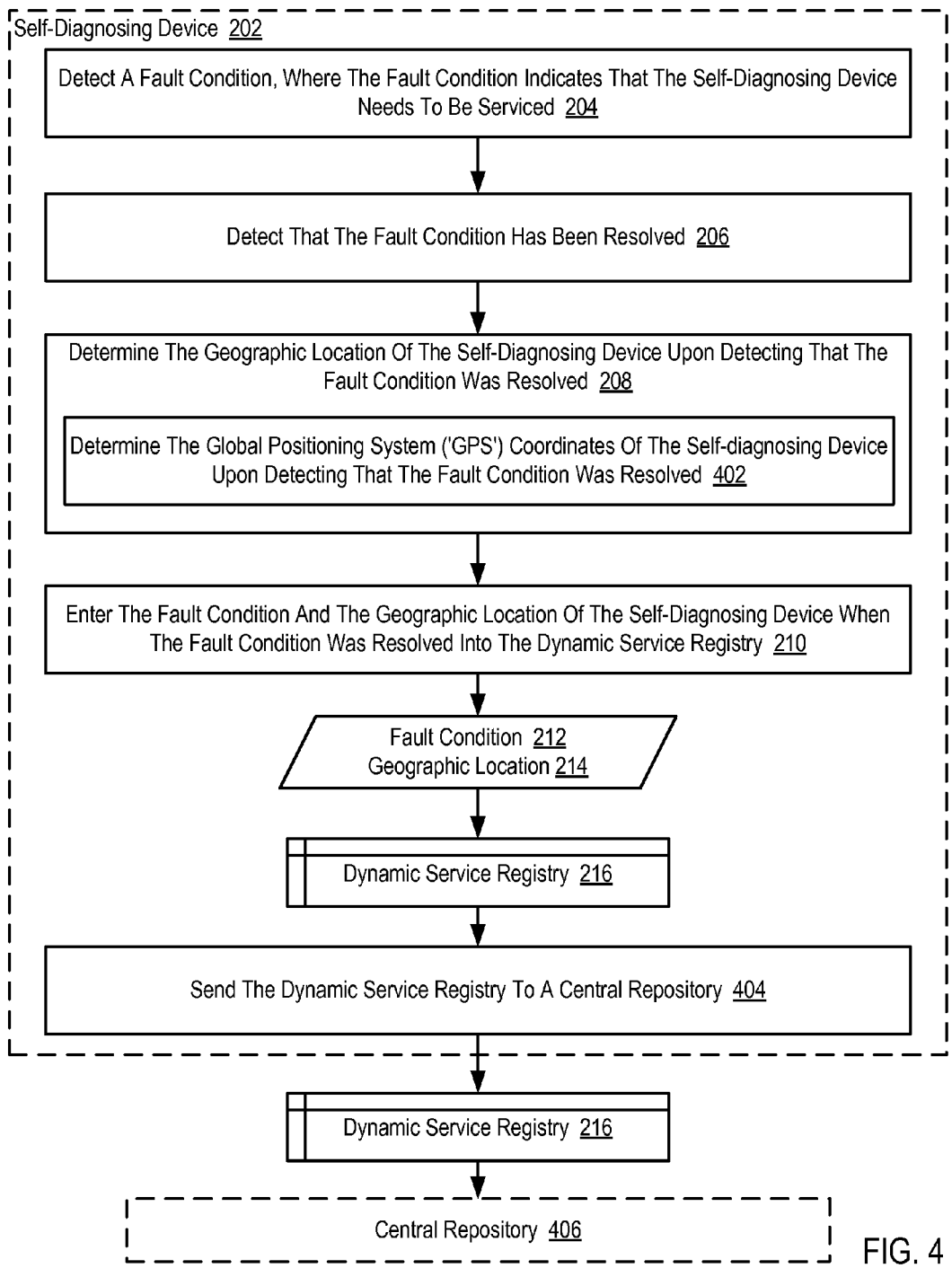
FIG. 4 sets forth a flow chart illustrating a further example method for maintaining a dynamic service registry for a self-diagnosing device according to embodiments of the present invention.

For further explanation, FIG. 4 sets forth a flow chart illustrating a further example method for maintaining a dynamic service registry (216) for a self-diagnosing device (202) according to embodiments of the present invention. The example of FIG. 4 is similar to the example of FIG. 2 as it also includes detecting (204) a fault condition, detecting (206) that the fault condition has been resolved, determining (208) the geographic location of the self-diagnosing device (202) upon detecting that the fault condition was resolved, and entering (210) into the dynamic service registry (216) the fault condition and the geographic location of the self-diagnosing device (202) when the fault condition was resolved.

In the example method of FIG. 4, determining (208) the geographic location of the self-diagnosing device (202) upon detecting that the fault condition was resolved can include determining (402), by the self-diagnosing device (202), the GPS coordinates of the self-diagnosing device (202) upon detecting that the fault condition was resolved. The GPS coordinates of the self-diagnosing device (202) may be determined (402), for example, through the use of GPS receiver configured to receive the GPS coordinates at which the GPS receiver is located. S The example method of FIG. 4 also includes sending (404), by the self-diagnosing device (202), the dynamic service registry (216) to a central repository (406). In the example method of FIG. 4, the central repository (406) may be embodied, for example, as data storage configured to store service registries submitted by a plurality of related self-diagnosing devices. For example, the central repository (406) may be embodied as automated computing machinery configured to receive, store, and merge service repositories submitted by multiple automobiles or other self-diagnosing devices. The central repository may therefore be used by a particular self-diagnosing device to assist in the resolution of fault conditions even if the particular self-diagnosing device has no history of resolving identical or related fault conditions.

Figure 5:
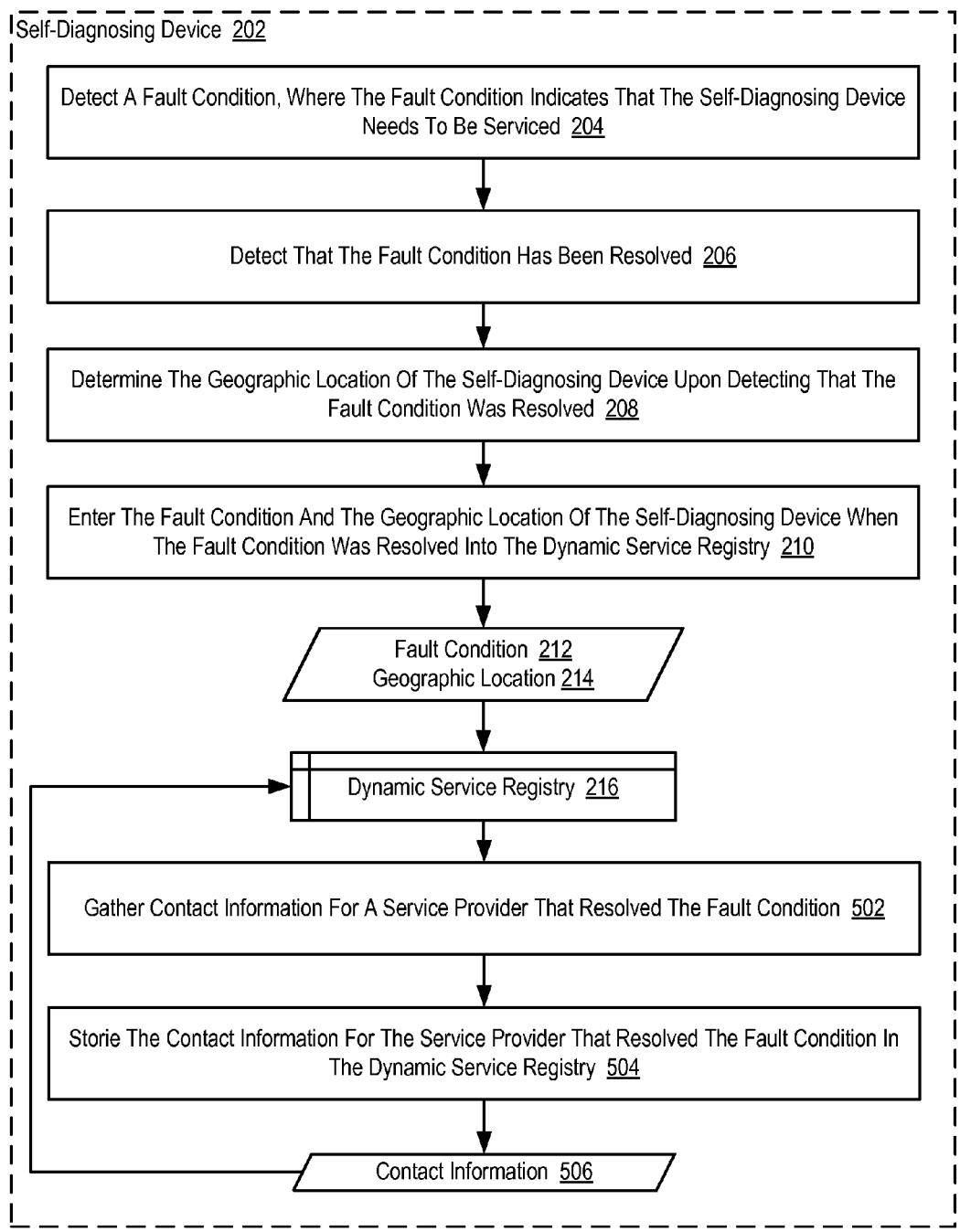
FIG. 5 sets forth a flow chart illustrating a further example method for maintaining a dynamic service registry for a self-diagnosing device according to embodiments of the present invention.

For further explanation, FIG. 5 sets forth a flow chart illustrating a further example method for maintaining a dynamic service registry (216) for a self-diagnosing device (202) according to embodiments of the present invention. The example of FIG. 5 is similar to the example of FIG. 2 as it also includes detecting (204) a fault condition, detecting (206) that the fault condition has been resolved, determining (208) the geographic location of the self-diagnosing device (202) upon detecting that the fault condition was resolved, and entering (210) into the dynamic service registry (216) the fault condition and the geographic location of the self-diagnosing device (202) when the fault condition was resolved.

The example method of FIG. 5 also includes gathering (502), by the self-diagnosing device (202), contact information for a service provider that resolved the fault condition. In the example method of FIG. 5, contact information for a service provider that resolved the fault condition may be embodied, for example, as a physical address for the service provider that resolved the fault condition, an email address for the service provider that resolved the fault condition, a phone number for the service provider that resolved the fault condition, and so on.

In the example method of FIG. 5, gathering (502) contact information for a service provider that resolved the fault condition may be carried out, for example, by prompting the service provider to enter such contact information, by prompting the owner or user of the self-diagnosing device (202), by using search technologies and the location of the service provider that resolved the fault condition to determine such information, and so on.

Consider the example described above in which the self-diagnosing device (202) is an automobile that includes an oil level sensor for measuring the amount of oil in the automobile's engine, a 'low oil level' fault condition was detected, and the self-diagnosing device (202) subsequently detects that the fault condition has been resolved. In such an example, a message may be displayed on the automobile's navigation system display screen indicating that the fault condition has been resolved. The operator of the automobile, which may be the auto repair technician, the car's owner, or other operator may subsequently be prompted to enter contact information for the service provider that resolved the fault condition. In such an example, the contact information may even be sent to the central repository (406 in FIG. 4) such that other automobile owners can receive such contact information from the central repository (406 in FIG. 4) by searching the central repository (406 in FIG. 4) using the geographic location of a service provider that resolved a fault condition for another automobile owner.

The example method of FIG. 5 also includes storing (504), by the self-diagnosing device (202), the contact information (506) for the service provider that resolved the fault condition in the dynamic service registry (216). In the example method of FIG. 5, storing (504) the contact information (506) for the service provider that resolved the fault condition in the dynamic service registry (216) may be carried out, for example, by storing the contact information in an entry in the dynamic service registry (216) that corresponds to the service provider that resolved the fault condition.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of maintaining a dynamic service registry for a self-diagnosing device, the method comprising:
    detecting, by the self-diagnosing device, a fault condition, wherein the fault condition indicates that the self-diagnosing device needs to be serviced;
    detecting, by the self-diagnosing device, that the fault condition has been resolved;
    determining, by the self-diagnosing device, the geographic location of the self-diagnosing device upon detecting that the fault condition was resolved; and
    entering, by the self-diagnosing device, the fault condition and the geographic location of the self-diagnosing device when the fault condition was resolved into the dynamic service registry.

2. The method of claim 1 further comprising:
    identifying in dependence upon entries in the dynamic service registry, by the self-diagnosing device, a candidate service provider to service the fault condition; and
    sending, by the self-diagnosing device, information describing the fault condition to the candidate service provider.

3. The method of claim 1 further comprising sending, by the self-diagnosing device, the dynamic service registry to a central repository.

4. The method of claim 1 wherein the self-diagnosing device is included in an automobile.

5. The method of claim 1 wherein determining the geographic location of the self-diagnosing device upon detecting that the fault condition was resolved further comprises determining, by the self-diagnosing device, the global positioning system ('GPS') coordinates of the self-diagnosing device upon detecting that the fault condition was resolved.

6. The method of claim 1 further comprising:
    gathering, by the self-diagnosing device, contact information for a service provider that resolved the fault condition; and
    storing, by the self-diagnosing device, the contact information for the service provider that resolved the fault condition in the dynamic service registry.

7. An apparatus for maintaining a dynamic service registry for a self-diagnosing device, the apparatus comprising a computer processor, a computer memory operatively coupled to the computer processor, the computer memory having disposed within it computer program instructions that, when executed by the computer processor, cause the apparatus to carry out the steps of:
    detecting, by the self-diagnosing device, a fault condition, wherein the fault condition indicates that the self-diagnosing device needs to be serviced;
    detecting, by the self-diagnosing device, that the fault condition has been resolved;
    determining, by the self-diagnosing device, the geographic location of the self-diagnosing device upon detecting that the fault condition was resolved; and
    entering, by the self-diagnosing device, the fault condition and the geographic location of the self-diagnosing device when the fault condition was resolved into the dynamic service registry.

8. The apparatus of claim 7 further comprising computer program instructions that, when executed by the computer processor, cause the apparatus to carry out the steps of:
    identifying in dependence upon entries in the dynamic service registry, by the self-diagnosing device, a candidate service provider to service the fault condition; and
    sending, by the self-diagnosing device, information describing the fault condition to the candidate service provider.

9. The apparatus of claim 7 further comprising computer program instructions that, when executed by the computer processor, cause the apparatus to carry out the step of sending, by the self-diagnosing device, the dynamic service registry to a central repository.

10. The apparatus of claim 7 wherein the self-diagnosing device is included in an automobile.

11. The apparatus of claim 7 wherein determining the geographic location of the self-diagnosing device upon detecting that the fault condition was resolved further comprises determining, by the self-diagnosing device, the global positioning system ('GPS') coordinates of the self-diagnosing device upon detecting that the fault condition was resolved.

12. The apparatus of claim 7 further comprising computer program instructions that, when executed by the computer processor, cause the apparatus to carry out the steps of:
    gathering, by the self-diagnosing device, contact information for a service provider that resolved the fault condition; and
    storing, by the self-diagnosing device, the contact information for the service provider that resolved the fault condition in the dynamic service registry.

13. A computer program product for maintaining a dynamic service registry for a self-diagnosing device, the computer program product disposed upon a computer readable medium, wherein the computer readable medium is not a signal, the computer program product comprising computer program instructions that, when executed, cause a computer to carry out the steps of:
    detecting, by the self-diagnosing device, a fault condition, wherein the fault condition indicates that the self-diagnosing device needs to be serviced;
    detecting, by the self-diagnosing device, that the fault condition has been resolved;
    determining, by the self-diagnosing device, the geographic location of the self-diagnosing device upon detecting that the fault condition was resolved; and entering, by the self-diagnosing device, the fault condition and the geographic location of the self-diagnosing device when the fault condition was resolved into the dynamic service registry.

14. The computer program product of claim 13 further comprising computer program instructions that, when executed, cause the computer to carry out the steps of:

identifying in dependence upon entries in the dynamic service registry, by the self-diagnosing device, a candidate service provider to service the fault condition; and sending, by the self-diagnosing device, information describing the fault condition to the candidate service provider.

15. The computer program product of claim 13 further comprising computer program instructions that, when executed, cause the computer to carry out the step of sending, by the self-diagnosing device, the dynamic service registry to a central repository.

16. The computer program product of claim 13 wherein the self-diagnosing device is included in an automobile.

17. The computer program product of claim 13 wherein determining the geographic location of the self-diagnosing device upon detecting that the fault condition was resolved further comprises determining, by the self-diagnosing device, the global positioning system ('GPS') coordinates of the self-diagnosing device upon detecting that the fault condition was resolved.

18. The computer program product of claim 13 further comprising computer program instructions that, when executed, cause the computer to carry out the steps of:

gathering, by the self-diagnosing device, contact information for a service provider that resolved the fault condition; and storing, by the self-diagnosing device, the contact information for the service provider that resolved the fault condition in the dynamic service registry.

\* \* \* \* \*